US011414094B2

(12) United States Patent
McGill

(10) Patent No.: US 11,414,094 B2
(45) Date of Patent: Aug. 16, 2022

(54) SYSTEMS AND METHODS FOR SWITCHING BETWEEN A PRIMARY DRIVER AND A SECONDARY DRIVER FOR A VEHICLE

(71) Applicant: Toyota Research Institute, Inc., Los Altos, CA (US)

(72) Inventor: Stephen G. McGill, Broomall, PA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 118 days.

(21) Appl. No.: 16/829,938

(22) Filed: Mar. 25, 2020

(65) Prior Publication Data
US 2021/0300396 A1    Sep. 30, 2021

(51) Int. Cl.
*B60W 50/12* (2012.01)
*B60W 40/09* (2012.01)
*B60W 40/08* (2012.01)

(52) U.S. Cl.
CPC .......... *B60W 50/12* (2013.01); *B60W 40/09* (2013.01); *B60W 2040/0827* (2013.01); *B60W 2040/0836* (2013.01); *B60W 2040/0863* (2013.01); *B60W 2540/229* (2020.02); *B60W 2540/26* (2013.01); *B60W 2540/30* (2013.01)

(58) Field of Classification Search
None
See application file for complete search history.

(56) References Cited

U.S. PATENT DOCUMENTS

| 7,663,495 B2* | 2/2010 | Haque | G08B 21/06 340/576 |
| 8,695,750 B1* | 4/2014 | Hammond | B62D 1/22 180/403 |
| 8,851,225 B2* | 10/2014 | Braun | E02F 9/2004 180/324 |
| 9,884,631 B2 | 2/2018 | James et al. | |
| 2010/0109881 A1* | 5/2010 | Eskandarian | A61B 5/7267 340/575 |

(Continued)

FOREIGN PATENT DOCUMENTS

CN   106094810 A    11/2016
CN   109649475 A *   4/2019

(Continued)

OTHER PUBLICATIONS

Ren; Machine translation of CN-109649475-A; Apr. 2019; espacenet.com (Year: 2019).*

(Continued)

*Primary Examiner* — David P. Merlino
(74) *Attorney, Agent, or Firm* — Dinsmore & Shohl LLP

(57) ABSTRACT

A vehicle system is provided. The vehicle system includes a first driving input device, a second driving input device, and an autonomous vehicle control module. The autonomous vehicle control module is configured to monitor a driving behavior of a first driver operating the first driving input and to automatically transfer vehicle control of a vehicle from the first driver to the second driver when one or more requirements are met based on the driving behavior of the first driver. The autonomous vehicle control module is further configured to analyze switching of vehicle control between the first driver and the second driver.

20 Claims, 8 Drawing Sheets

(56) References Cited

U.S. PATENT DOCUMENTS

| | | | |
|---|---|---|---|
| 2013/0002416 A1* | 1/2013 | Gazit | B62D 15/0255 |
| | | | 340/438 |
| 2015/0360698 A1* | 12/2015 | Beyene | B60W 40/09 |
| | | | 701/41 |
| 2017/0322552 A1* | 11/2017 | Hilnbrand | B60W 50/08 |
| 2018/0165531 A1* | 6/2018 | Sathyanarayana | |
| | | | G06K 9/00805 |
| 2018/0196427 A1* | 7/2018 | Majumdar | G05D 1/0088 |
| 2019/0092389 A1 | 3/2019 | McGill et al. | |
| 2019/0241207 A1* | 8/2019 | Jeong | B60R 16/0231 |
| 2020/0285242 A1* | 9/2020 | Gu | G06N 7/023 |

FOREIGN PATENT DOCUMENTS

| | | |
|---|---|---|
| CN | 108052888 B | 8/2019 |
| CN | 110087962 A | 8/2019 |
| JP | 2012051441 A | 3/2012 |
| WO | 2004000598 A1 | 12/2003 |

OTHER PUBLICATIONS

"Toyota Research Institute Introduces Next-Generation Automated Driving Research Vehicle at CES", Jan. 5, 2018, 4 pages, https://global.toyota/en/newsroom/corporate/20564649.html.

Jeff Reinke, "Why This Driverless Car Needs Two Steering Wheels", Oct. 6, 2017, 1 page, https://www.thomasnet.com/insights/why-this-driverless-car-needs-two-steeringwheels/.

* cited by examiner

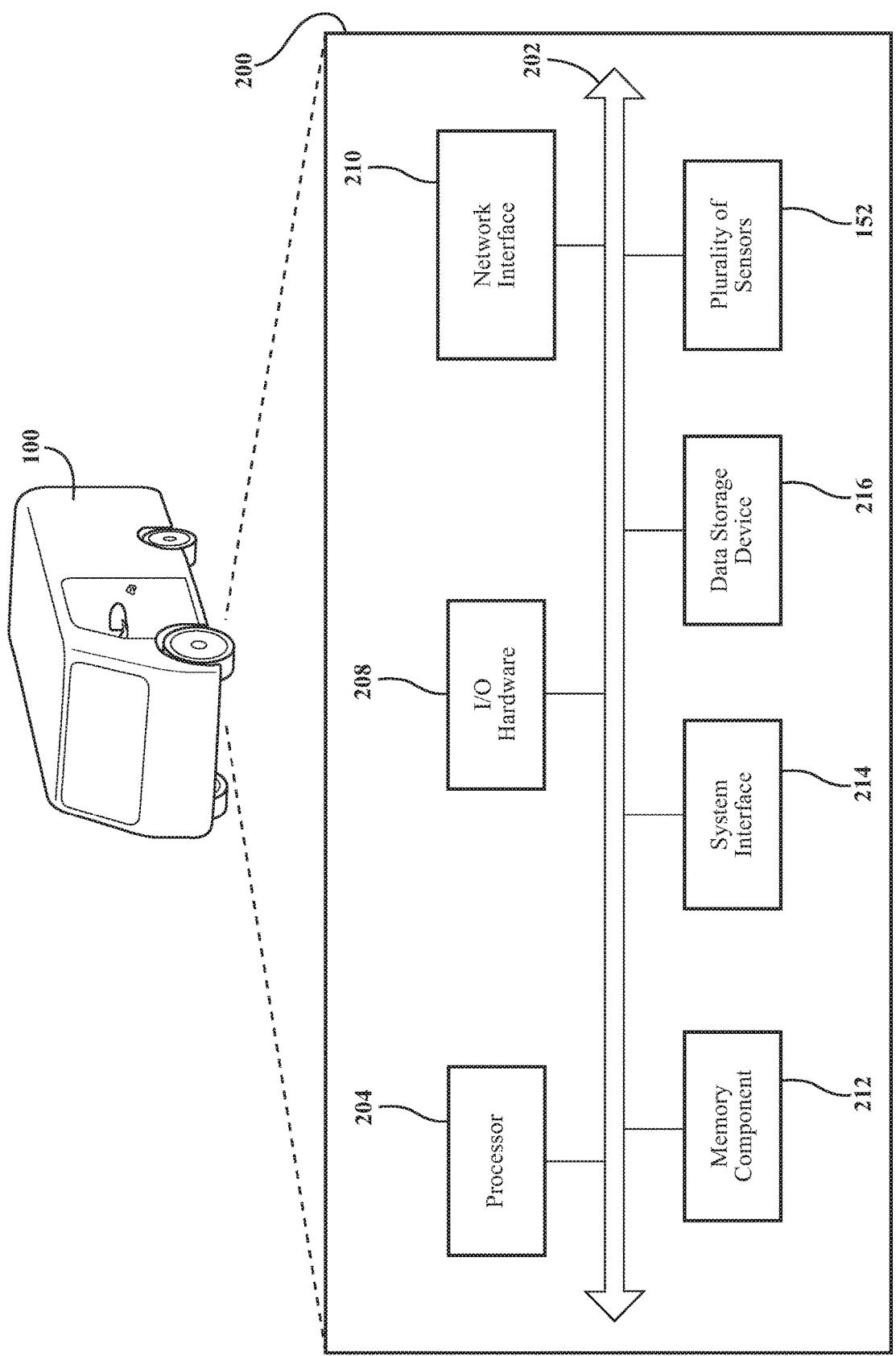

SYSTEMS AND METHODS FOR SWITCHING BETWEEN A PRIMARY DRIVER AND A SECONDARY DRIVER FOR A VEHICLE

TECHNICAL FIELD

Embodiments described herein generally relate to systems and methods for switching between drivers in a dual cockpit vehicle and, more specifically, to systems and methods for switching between a primary driver and a secondary driver when one or more requirements are met based on a driving behavior.

BACKGROUND

Dual cockpit vehicles allow for more than one driver to be positioned within the vehicle at a time. Drivers who are tired and not focused may drive vehicles in an improper manner. For example, the driver may not react to the environment in a normal manner or may begin to drive in an erratic manner. As another example, a new driver may not readily recognize driving conditions and may fail to adequately navigate the conditions.

SUMMARY

In one embodiment, a vehicle system is provided. The vehicle system includes a first driving input device, a second driving input device, and an autonomous vehicle control module. The autonomous vehicle control module is configured to monitor a driving behavior of a first driver operating the first driving input device and to automatically transfer a vehicle control of a vehicle from the first driver to the second driver when one or more requirements are met based on the driving behavior of the first driver. The autonomous vehicle control module is further configured to analyze switching of vehicle control between the first driver and the second driver.

In another embodiment, a dual-cockpit vehicle is provided. The dual-cockpit vehicle includes a first driving input device, a second driving input device, and an autonomous vehicle control module. The autonomous vehicle control module includes one or more processors, one or more memory modules communicatively coupled to the one or more processors, and machine readable instructions stored in the one or more memory modules that cause the autonomous vehicle control module to perform at least the following when executed by the one or more processors: monitor a driving behavior of a first driver operating the first driving input device and a second driver operating the second driving input device, record the driving behavior of the first driver operating the first driving input device and the second driver operating the second driving input device, determine whether the driving behavior of the first driver operating the first driving input device meets one or more requirements, and transfer vehicle control of the dual-cockpit vehicle from the first driver to the second driver when one or more requirements are met based on the driving behavior of the first driver.

In another embodiment, a vehicle system is provided. The vehicle system includes a first steering wheel, a first accelerator pedal and a first brake pedal operated by a first driver, a second steering wheel, a second accelerator pedal and a second brake pedal operated by a second driver, and an autonomous vehicle control module. The autonomous vehicle control module further includes one or more processors, one or more memory modules communicatively coupled to the one or more processors, and machine readable instructions stored in the one or more memory modules that cause the autonomous vehicle control module to perform at least the following when executed by the one or more processors: monitor a driving behavior of the first driver operating the first steering wheel, the first accelerator pedal and the first brake pedal, record the driving behavior of the first driver operating the first steering wheel and the first brake pedal, determine whether the driving behavior of the first driver operating the first steering wheel, the first accelerator pedal and the first brake pedal meets one or more requirements, and transfer a vehicle control of a vehicle from the first driver to the second driver when the one or more requirements are met based on the driving behavior of the first driver.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2A schematically depicts illustrative hardware components of an autonomous vehicle control module of the dual cockpit system of FIG. 1 for switching between operating modes of the vehicle of FIG. 1 according to one or more embodiments shown and described herein;

DETAILED DESCRIPTION

Figure 1:
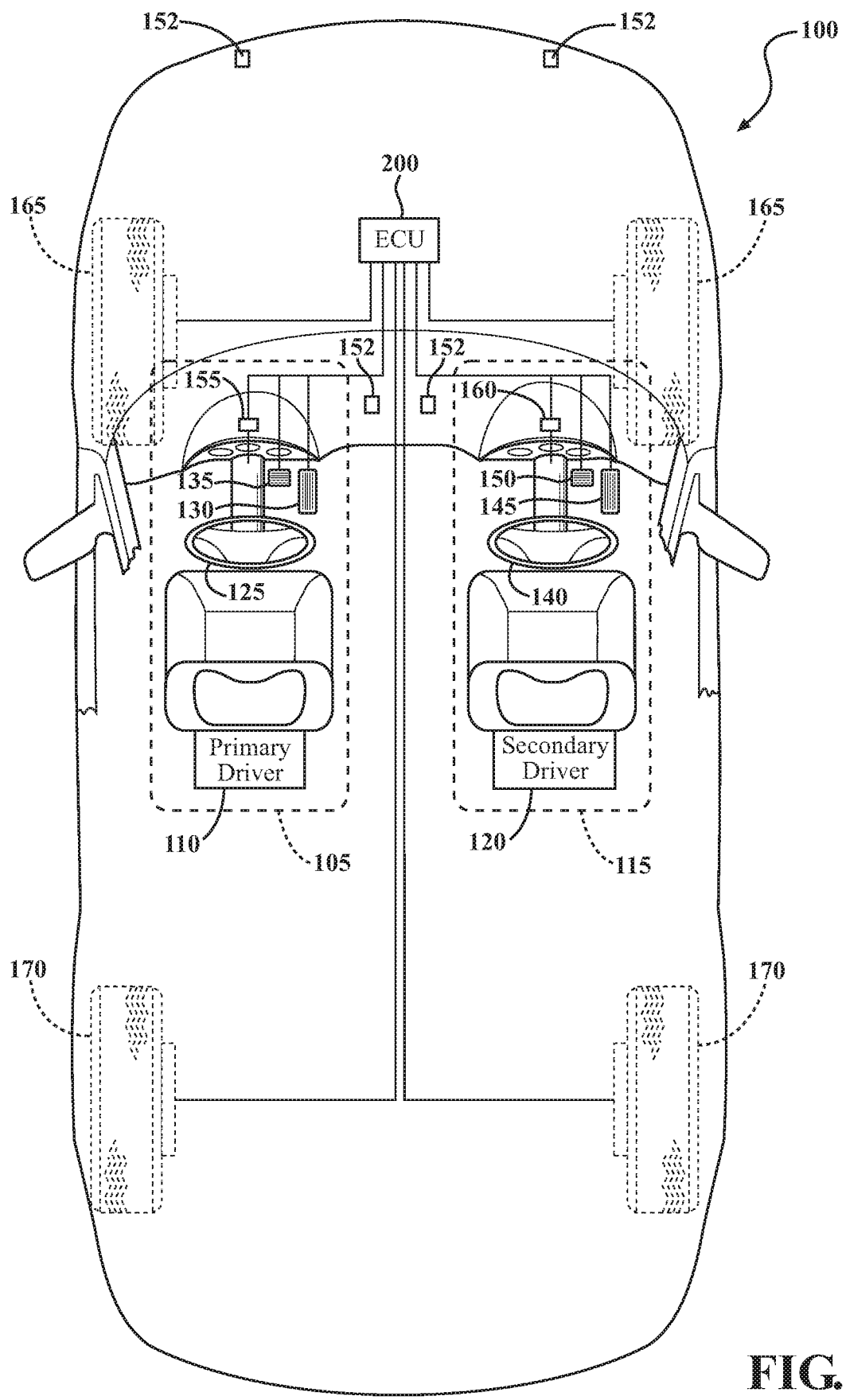
FIG. 1 schematically depicts a vehicle having a dual cockpit system according to one or more embodiments shown and described herein.

The embodiments disclosed herein include vehicle systems for operating dual cockpit vehicles in different modes including a first driver mode, a second driver mode and an autonomous driving mode. The vehicle system includes a first driving input device that is operated by a primary driver, a second driving input device that is operated by a secondary driver and an autonomous vehicle control module. The autonomous vehicle control module is configured to monitor a driving behavior of the primary driver operating the first driving input device and a driving behavior of the secondary driver operating the second driving input device. The autonomous vehicle control module automatically transfers vehicle control of the vehicle from the primary driver to the secondary driver when one or more requirements are met based on the driving behavior of the primary driver, and vice-versa.

In some embodiments, the autonomous vehicle control module automatically transfers vehicle control between the primary or secondary driver modes and the autonomous driving mode to learn which are good behaviors and which are bad behaviors between the primary and secondary drivers. The vehicle system further includes at least two autonomous vehicle controller software algorithms. Each of the at least two autonomous vehicle controller software algorithms score a respective driver in the primary driver and secondary driver modes. The vehicle system further includes one or more sensors configured to determine a driving status of the primary driver and the secondary driver. The one or more requirements is the determined driving status of the primary driver or the secondary driver. The at least two autonomous vehicle controller software algorithms instruct the primary driver and the second driver to alternate between control of the vehicle such that the autonomous vehicle control module may analyze a plurality of data such as a vehicle data, a psychological data, and a biological data to determine an efficiency of the switching of vehicle control between the first driver and the second driver.

The vehicle system includes one or more processors, one or more memory modules communicatively coupled to the one or more processors, and machine readable instructions stored in the one or more memory modules that, when executed by the one or more processors, cause the vehicle system to monitor a driving behavior of the primary driver operating the first driving input and a secondary driver operating the second driving input. Further, the processors cause the vehicle system to record the driving behavior of the primary driver operating the first driving input and the secondary driver operating the secondary driving input driving, determine whether the driving behavior of the primary driver operating the first driving input meets one or more requirements, and transfer vehicle control of the dual cockpit vehicle from the primary driver to the secondary driver when one or more requirements are met based on the driving behavior of the primary driver.

The vehicle systems for switching control of the vehicle between the primary and secondary driver modes and an autonomous driving mode will be described in more detail herein with specific reference to the corresponding drawings.

FIG. 1 schematically depicts a vehicle 100 having a dual cockpit system according to one or more embodiments shown and described herein. The vehicle 100 may be an automobile, a semi-truck, a carrier, or any other passenger or non-passenger vehicle such as, for example, a terrestrial, aquatic, and/or airborne vehicle. In some embodiments, the vehicle 100 is an autonomous vehicle that navigates its environment with limited human input or without human input.

The vehicle 100 includes a dual cockpit system including a first cockpit 105 for a primary driver 110 and a second cockpit 115 for a secondary driver 120. In other embodiments, the first cockpit 105 includes a first steering wheel 125, a first accelerator pedal 130, and a first brake pedal 135. The second cockpit 115 includes a second steering wheel 140, a second accelerator pedal 145, and a second brake pedal 150.

In some embodiments, the first steering wheel 125 may be electrically or electro-mechanically connected to a vehicle system. The first steering wheel 125 may be connected to a steering wheel interface module 155 that sends out steering signals dependent on the steering wheel position to other components of the vehicle, e.g., a steering electronic control unit (ECU). The second steering wheel 140 may be electrically or electro-mechanically connected to the vehicle system. The second steering wheel 140 may be connected to a steering wheel interface module 160 that sends out steering signals dependent on the steering wheel position to other components of the vehicle, e.g., the steering electronic control unit (ECU).

In some embodiments, both or either of the first steering wheel 125 and the second steering wheel 140 may be mechanically linked to the front wheels 165, rear wheels 170, and a combination thereof. Further, while FIG. 1 depicts that the first cockpit 105 is on the left side of the vehicle 100 and the second cockpit 115 is on the right side of the vehicle 100, in some embodiments, the first cockpit 105 may be on the right side of the vehicle 100 and the second cockpit 115 may be on the left side of the vehicle 100.

In some embodiments, the first accelerator pedal 130 may be electrically or electro-mechanically connected to a vehicle system to send electrical signals indicative of a position of the first accelerator pedal 130 to an accelerator ECU. The second accelerator pedal 145 may also be electrically or electro-mechanically connected to the vehicle system to send electrical signals indicative of a position of the second accelerator pedal 145 to the accelerator ECU.

In some embodiments, the first brake pedal 135 may be mechanically linked to the brakes of the vehicle 100. In other embodiments, the first brake pedal 135 may be electrically or electro-mechanically connected to a vehicle system to send electrical signals indicative of a position of the first brake pedal 135 to a brake ECU. The second brake pedal 150 may be mechanically linked to the brakes of the vehicle 100. In other embodiments, the second brake pedal 150 may be electrically or electro-mechanically connected to a vehicle system to send electrical signals indicative of a position of the second brake pedal 150 to a brake ECU.

In various embodiments, the vehicle 100 may include a plurality of sensors 152, such as, for example, a sensor that monitors the primary driver 110 and/or the secondary driver 120. As described in greater detail herein, the various sensors may generally be used to sense a current driving status of the primary driver 110 and/or the secondary driver 120, such as whether the primary driver 110 and/or the secondary driver 120 are tired. Further, in some embodiments, the plurality of sensors 152 may collect a plurality of other data such as a vehicle data, a psychological data, a physiological data and/or a biological data to determine an efficiency, reactions, human variables, computer variables and the like, of the switching of vehicle control between the primary driver 110 and the secondary driver 120. As such, it should be appreciated that the vehicle data may include actual vehicle data such as a current speed, a current location, and the like. The psychological and physiological data may include data related to how the primary driver and the secondary driver react to the switch, how one driver reacts to certain impairments, such as either the primary driver 110 or the secondary driver 120 acting like or are in fact a driver from the group of an intoxicated driver, an impaired driver, a tired driver, a teenage driver, and the like, to determine psychological and physiological data related to the switching of vehicle control between the primary driver 110 and the secondary driver 120. In some embodiments, instructing the primary driver 110 or the secondary driver 120 to act like a driver from the group of the intoxicated driver, the impaired driver, the tired driver, the teenage driver, and the like, may generate a plurality of data that is used to train at least two autonomous vehicle controller software algorithms, as discussed in greater detail herein. The biological data is data related to the type or characteristics of driver such as age, ethnicity, gender, and the like.

The plurality of sensors 152 may transmit a plurality of outputs, either wired or wirelessly, to the autonomous vehicle control module 200, as explained in greater detail herein. Each of the plurality of sensors 152 may be LiDAR sensors, photoelectric sensors, laser-based sensors, proximity sensors, level detection sensors, pressure sensors, any combination thereof, and/or any other type of sensor that one skilled in the art may appreciate.

In embodiments, the vehicle 100 may operate under three operational modes. The first mode is a primary driver mode where the vehicle 100 is operated by the primary driver 110 manipulating the first steering wheel 125, the first accelerator pedal 130, and/or the first brake pedal 135. The second mode is a secondary driver mode where the vehicle 100 is operated by the secondary driver 120 manipulating the second steering wheel 140, the second accelerator pedal 145, and/or the second brake pedal 150. The third mode is an autonomous driving mode where the vehicle operates autonomously under the control of an autonomous vehicle control module 200 of the vehicle 100.

In embodiments, the primary driver mode is where the vehicle 100 is controlled by the primary driver 110, manipulating the first steering wheel 125, the first accelerator pedal 130, and/or the first brake pedal 135. When the autonomous vehicle control module 200 determines that the vehicle 100 needs to operate under the second operator mode, the autonomous vehicle control module 200 instructs the secondary driver to assume vehicle control and transfers vehicle control to the second steering wheel 140, the second accelerator pedal 145, and/or the second brake pedal 150. Further, the autonomous vehicle control module 200 may assume vehicle control in the autonomous driving mode such that autonomous vehicle control module 200 provides control signals to the various electronic control units of the vehicle 100. As such, in some embodiments, during the autonomous driving mode, only some of the vehicle functions may operate autonomously. For example, steering of the vehicle 100 may operate autonomously while an acceleration or declaration of the vehicle 100 may be controlled by the primary driver 110 who presses upon the first accelerator pedal 130 or the first brake pedal 135 to accelerate or brake and/or by the secondary driver 120 who presses upon the second accelerator pedal 145 or the second brake pedal 150 to accelerate or brake the vehicle 100. In other embodiments, during the autonomous driving mode, the signals for the components operated by the primary driver 110 (i.e., the first steering wheel 125, the first accelerator pedal 130, and/or the first brake pedal 135) and the components operated by the secondary driver 120 (i.e., the second steering wheel 140, the second accelerator pedal 145, and/or the second brake pedal 150) may be disabled. It should be understood that the operation mode of the vehicle 100 may switch among the primary driver mode, the secondary driver mode, and the autonomous driving mode and details of the modes and the operation of switching among the modes will be described further below.

FIG. 2A schematically depicts illustrative hardware components of the vehicle 100 that may be used to operate under and/or switch between the three operational modes. The vehicle 100 may include the autonomous vehicle control module 200 having a non-transitory computer-readable medium storing computer-readable programming instructions for completing the various processes described herein, embodied as hardware, software, and/or firmware, according to embodiments shown and described herein. While in some embodiments the autonomous vehicle control module 200 may be configured as a general purpose computer with the requisite hardware, software, and/or firmware, in other embodiments, the autonomous vehicle control module 200 may also be configured as a special purpose computer designed specifically for performing the functionality described herein. For example, the autonomous vehicle control module 200 may be a device that is particularly adapted to analyze switching of vehicle control between the three operational modes. In another example, the autonomous vehicle control module 200 may be a device that is adapted with at least two autonomous vehicle controller software algorithms, and each of the at least two autonomous vehicle controller software algorithms are scored based on the driving behavior between the primary driver and the secondary driver. In another example, the autonomous vehicle control module 200 may be a device that is particularly adapted to utilize machine learning algorithms for the purposes of monitoring a driving behavior of the primary driver 110 (FIG. 1) and/or the secondary driver 120 (FIG. 1) of the vehicle 100 and based on one or more requirements automatically transfer vehicle control of the vehicle from the primary driver 110 (FIG. 1) to the secondary driver 120 (FIG. 1), and vice-versa, when one or more requirements are met based on the driving behavior of the primary driver 110 (FIG. 1) and/or secondary driver 120 (FIG. 1).

Other uses of machine learning in vehicles should be understood. In embodiments where the autonomous vehicle control module 200 is a general purpose computer, the systems and methods described herein provide a mechanism for improving vehicle control functionality by monitoring the driving behaviors of the primary driver 110 (FIG. 1) and/or the secondary driver 120 (FIG. 1) and when one or more requirements are met based on the driving behavior of the primary driver 110 (FIG. 1) and/or secondary driver 120 (FIG. 1), automatically switch the vehicle control.

Still referring to FIG. 2A, the autonomous vehicle control module 200 may generally be an onboard vehicle computing system. In some embodiments, the autonomous vehicle control module 200 may be a plurality of vehicle computing systems. As also illustrated in FIG. 2A, the autonomous vehicle control module 200 may include a processor 204, an I/O hardware 208, a network interface hardware 210, a non-transitory memory component 212, a system interface 214, a data storage device 216, and the plurality of sensors 152. A local interface 202, such as a bus or the like, may interconnect the various components.

It should be understood that the local interface 202 may be formed from any medium that is capable of transmitting a signal such as, for example, conductive wires, conductive traces, optical waveguides, or the like. In some embodiments, the local interface 202 may facilitate the transmission of wireless signals, such as Wi-Fi, Bluetooth, Near Field Communication (NFC) and the like. Moreover, the local interface 202 may be formed from a combination of mediums capable of transmitting signals. In one embodiment, the local interface 202 comprises a combination of conductive traces, conductive wires, connectors, and buses that cooperate to permit the transmission of electrical data signals to components such as processors, memories, sensors, input devices, output devices, and communication devices. Accordingly, the local interface 202 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The processor 204, such as a computer processing unit (CPU), may be the central processing unit of the autonomous vehicle control module 200, performing calculations and logic operations to execute a program. The processor 204, alone or in conjunction with the other components, is an illustrative processing device, computing device, processor, or combination thereof. The processor 204 may include any processing component configured to receive and execute instructions (such as from the data storage device 216 and/or the memory component 212).

The memory component 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 212 may include one or more programming instructions thereon that, when executed by the processor 204, cause the processor 204 to complete various processes, such as the processes described herein with respect to FIGS. 3-7. Still referring to FIG. 2A, the programming instructions stored on the memory component 212 may be embodied as a plurality of software logic modules, where each logic module provides programming instructions for completing one or more tasks, as described in greater detail below with respect to FIG. 2B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the vehicle 100 and the other components of a network such as user computing devices, server computing devices, and the like.

Still referring to FIG. 2A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device, such as, for example, a server computing device or the like. Illustrative data that may be contained within the data storage device 216 is described below with respect to FIG. 2C. It should be appreciated that the amount of available storage space in the data storage device 216 may be limited due to its location in the autonomous vehicle control module 200 in some embodiments. As such, it may be necessary to minimize the size of the data stored thereon, as described in greater detail herein.

Still referring to FIG. 2A, the I/O hardware 208 may communicate information between the local interface 202 and one or more other components of the vehicle 100. For example, the I/O hardware 208 may act as an interface between the autonomous vehicle control module 200 and other components, such as the plurality of sensors 152, navigation systems, meter units, mobile phone systems, infotainment systems, and/or the like. In some embodiments, the I/O hardware 208 may be utilized to transmit one or more commands to the other components of the vehicle 100.

The system interface 214 may generally provide the autonomous vehicle control module 200 with an ability to interface with one or more external devices such as, for example, a user computing device and/or a server computing device. Communication with external devices may occur using various communication ports (not shown). An illustrative communication port may be attached to a communications network.

Still referring to FIG. 2A, the plurality of sensors 152 may be communicatively coupled to the local interface 202 and communicatively coupled to the processor 204 via the local interface 202. As used herein, the term "communicatively coupled" means that coupled components are capable of exchanging data signals with one another such as, for example, electrical signals via conductive medium, electromagnetic signals via air, optical signals via optical waveguides, and the like. The plurality of sensors 152 may be any sensing device, sensor, or detector that is suitable for obtaining or collecting data. Any suitable commercially available plurality of sensors 152 may be used without departing from the scope of the present disclosure. In some embodiments, the plurality of sensors 152 may be coupled to one or more other components that provide additional functionality for sensing, such as, for example, an image capturing device that captures images, whether still or video (a sequence of dynamic photos).

Figure 2B:
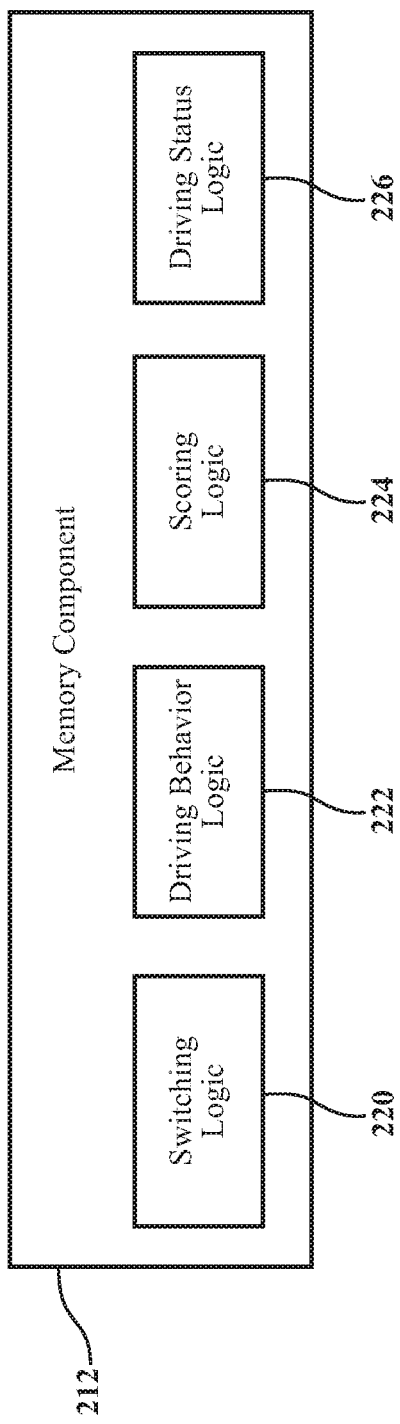
FIG. 2B schematically depicts an illustrative memory component containing illustrative logic components according to one or more embodiments shown and described herein.

With reference to FIG. 2B, in some embodiments, the program instructions contained on the memory component 212 may be embodied as a plurality of software modules, where each module provides programming instructions, machine readable and executable instructions, and/or the like, for completing one or more tasks. The programming instructions, machine readable and executable instructions, and the like may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, and the like, that may be compiled or assembled into machine readable and executable instructions and stored on the one or more memory component 212. Alternatively, the programming instructions, machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

For example, FIG. 2B schematically depicts the memory component 212 containing illustrative logic components according to one or more embodiments shown and described herein. As shown in FIG. 2B, the memory component 212 may be configured to store various processing logic, such as, for example, switching logic 220, driving behavior logic 222, scoring logic 224, and/or driving status logic 226 (each of which may be embodied as a computer program, firmware, or hardware, as an example).

Still referring to FIG. 2B, the switching logic 220 may contain one or more software modules and/or other software for managing components of the autonomous vehicle control module 200 (FIG. 2A). Further, the switching logic 220 may contain one or more software modules for transmitting data, and/or analyzing data, and/or switching the vehicle control between the three operational modes. The driving behavior logic 222 may contain one or more software modules for transmitting data, and/or analyzing data, and/or collecting data from one or more sources (e.g. the first steering wheel 125, the first accelerator pedal 130, the first brake pedal 135, the second steering wheel 140, the second accelerator pedal 145, and the second brake pedal 150 depicted in FIG. 1, and/or the like), as described in greater detail herein.

The scoring logic 224 may contain one or more software modules for collecting data from one or more sources (e.g. the first steering wheel 125, the first accelerator pedal 130, the first brake pedal 135, the second steering wheel 140, the second accelerator pedal 145, and the second brake pedal 150 depicted in FIG. 1, and/or the like) and/or from at least two autonomous vehicle controller software algorithms. Each of the at least two autonomous vehicle controller software algorithms score the primary driver 110 (FIG. 1) and/or the secondary driver 120 (FIG. 1) based on the driving behaviors of the primary and/or secondary drivers 110, 120 (FIG. 1) and/or between the primary and secondary drivers 110, 120 (FIG. 1), as described in greater detail herein. Moreover, the scoring logic 224 may create and/or score particular practices of each of the primary driver 110 (FIG. 1) and/or the secondary driver 120 (FIG. 1). The driving status logic 226 may contain one or more software modules for transmitting data, and/or analyzing data, and/or collecting data from one or more sources (e.g. the plurality of sensors 152 depicted in FIG. 1, and/or the like), to determine whether certain data is occurring (i.e., a tired driver).

Figure 2C:
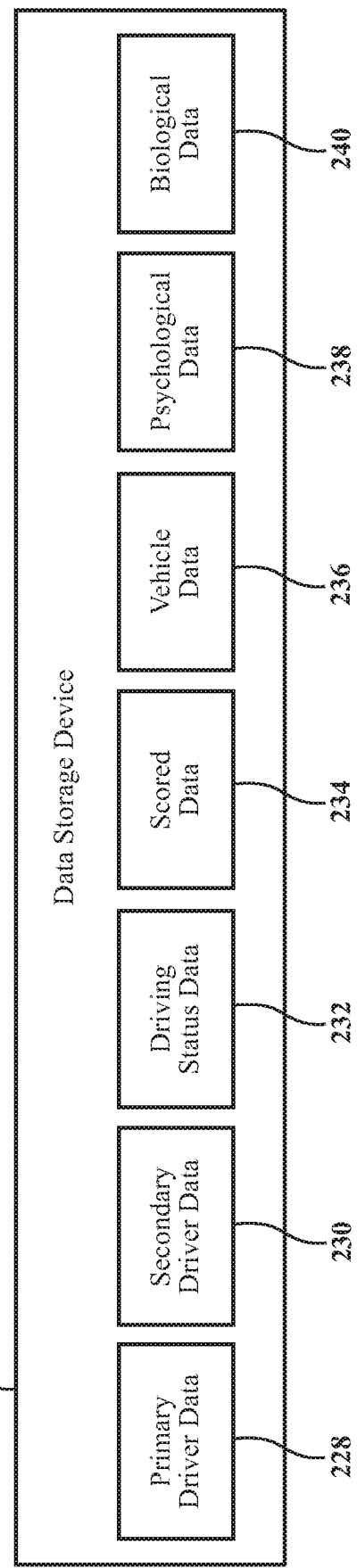
FIG. 2C schematically depicts an illustrative data storage device containing illustrative data components according to one or more embodiments shown and described herein.

FIG. 2C schematically depicts a block diagram of various data contained within a storage device (e.g., the data storage device 216). As shown in FIG. 2C, the data storage device 216 may include, for example, a plurality of stored driving behaviors of the primary driver data 228, such as the use, reactions and the like of the first steering wheel 125, the first accelerator pedal 130, the first brake pedal 135 of the primary driver 110, as illustrated in FIG. 1 and as discussed herein. The plurality of stored driving behaviors of the primary driver data 228 may also be data obtained from other vehicle components, such as the navigation system, data gathered by autonomous vehicles sensors, data gathered by the plurality of sensors 152 (FIG. 1), and the like. Further, the plurality of stored driving behaviors of the primary driver data 228 may store good driving behaviors, such as maintaining a proper speed, a proper distance from other vehicles, generally safe driving practices, and the like, and/or bad driving behavior, such as speeding, following too close, and generally unsafe driving practices.

The data storage device 216 may further include, for example, a plurality of stored driving behaviors of the secondary driver data 230, such as the use, reactions and the like, of the second steering wheel 140, the second accelerator pedal 145, the second brake pedal 150 of the secondary driver 120, as illustrated in FIG. 1 and as discussed herein. The plurality of stored driving behaviors of the secondary driver data 230 may also be data obtained from other vehicle components, such as the navigation system, data gathered by autonomous vehicles sensors, data gathered by the plurality of sensors 152 (FIG. 1), and the like. The plurality of stored driving behaviors of the secondary driver data 230 may store good driving behaviors, such as maintaining a proper speed, a proper distance from other vehicles, generally safe driving practices, and the like, and/or bad driving behavior, such as speeding, following too close, and generally unsafe driving practices. It should be appreciated that the plurality of stored driving behaviors of the primary driver data 228 and/or the plurality of stored driving behaviors of the secondary driver data 230 may not be stored permanently, but instead may be stored temporarily such that the data may be extracted therefrom.

The data storage device 216 may further include, for example, a plurality of stored driving status data 232, which may be received from the plurality of sensors 152 (FIG. 1), as discussed in greater detail herein. The plurality of sensors 152 within the vehicle 100 may capture images of the primary driver 110 (FIG. 1) and/or the secondary driver 120 (FIG. 1). The memory component 212 may include instructions for processing images received from the plurality of sensors 152 (FIG. 1). For example, the processor 204 may implement the instructions in the memory component 212 to process an image from the plurality of sensors 152 (FIG. 1) to identify a facial expression of the primary driver 110 (FIG. 1) and/or the secondary driver 120 (FIG. 1) such as whether the primary driver 110 (FIG. 1) and/or the secondary driver 120 (FIG. 1) are tired, intoxicated, and the like. In another example, the processor 204 may implement the instructions in the memory component 212 such that the plurality of sensors 152 (FIG. 1) identify a pupil size and/or blinking of the primary driver 110 (FIG. 1) and/or the secondary driver 120 (FIG. 1) to determine whether the primary driver 110 (FIG. 1) and/or the secondary driver 120 (FIG. 1) are tired, intoxicated, and the like.

It should be appreciated that any image processing technology may be used to process images from the plurality of sensors 152. Based on the identified facial expression, pupil size, blinking, and the like, the autonomous vehicle control module 200 may determine whether or not to transfer vehicle control between the three operational modes. For example, if the identified facial expression indicates abnormal facial expression, such as an expression indicating being exhausted, surprised, or nervous, the autonomous vehicle control module 200 may transfer vehicle control to a different operational mode.

The data storage device 216 further includes a scored data 234 determined from at least two autonomous vehicle controller software algorithms that determine a score based on the driving behaviors of the primary driver 110 (FIG. 1) and/or the secondary driver 120 (FIG. 1) and/or score the transferring of vehicle control of the vehicle 100 from the primary driver 110 (FIG. 1) driver to the secondary driver 120 (FIG. 1). It should be understood that the primary driver 110 (FIG. 1) and/or the secondary driver 120 (FIG. 1) may be source code (e.g., non-human) and each may be scored and/or the switching or transferring of the vehicle control between them may be scored. The data storage device 216 may further include, for example, a plurality of vehicle data 236 to determine an efficiency of the switching of vehicle control between the primary driver 110 (FIG. 1) and the secondary driver 120 (FIG. 1), a plurality of psychological and physiological data 238 of the primary driver 110 (FIG. 1) and/or the secondary driver 120 (FIG. 1), and a biological data 240 of the primary driver and/or the secondary driver to determine an efficiency of the switching of vehicle control between the primary driver and the secondary driver.

The plurality of vehicle data 236 may be received from vehicle components, such as the navigation system, data gathered by autonomous vehicles sensors, data gathered by the plurality of sensors 152 (FIG. 1), and the like. For example, data gathered from the autonomous vehicles sensors, data gathered by the plurality of sensors 152 (FIG. 1), and the like, and the autonomous vehicle control module 200 may monitor the speed of the vehicle 100, and initiate the autonomous driving mode and/or switching between drivers by sending a signal to operate in the autonomous mode and/or switch drivers when the speed of the vehicle 100 substantially deviates from a target speed. For example, if the vehicle speed is 80 mph and the autonomous vehicle control module 200 identifies that the current speed limit is 60 mph (e.g., by capturing and processing a speed limit sign, retrieving pre-stored speed limit information from the one or more software modules of the memory component 212 such as the driving behavior logic 222 or from a remote server), the autonomous vehicle control module 200 may initiate switch between operational modes to slow down the vehicle 100. As another example, if the vehicle speed is 40 mph and the autonomous vehicle control module 200 identifies that the vehicle 100 is driving on a highway (e.g., based on GPS information) and the current speed limit is 60 mph, the autonomous vehicle control module 200 may initiate a switch in the operational mode.

In some embodiments, the plurality of vehicle data 236 may also include route options between a current location and a destination, and retrieve traffic information for the route options. As such, for example, if the primary driver 110 operates the vehicle 100 to follow a heavy-traffic route, the autonomous vehicle control module 200 may initiate a switch of the operational mode such that either the secondary driver 120 and/or the autonomous mode will assume vehicle control to control the vehicle 100 to follow an alternative route with less traffic.

The plurality of psychological and physiological data 238 may be received from or data gathered by the plurality of sensors 152 (FIG. 1), such as how the primary driver 110 (FIG. 1) reacts to the switching of vehicle control, and/or how the secondary driver 120 (FIG. 1) reacts to the switching of vehicle control, and/or a combination thereof. For example, reactions may be anxiousness, calmness, and the like, that may affect how to switching takes place and/or once switched, on each driver reacts. The biological data 240 includes gender characteristics, race characteristics, ethnicity characteristics, and the like.

It should be understood that the components illustrated in FIGS. 2A-2C are merely illustrative and are not intended to limit the scope of this disclosure. More specifically, while the components in FIGS. 2A-2C are illustrated as residing within the autonomous vehicle control module 200 of the vehicle 100, this is a non-limiting example. In some embodiments, one or more of the components may reside external to the autonomous vehicle control module 200 and/or the vehicle 100.

As mentioned above, the various components described with respect to FIGS. 2A-2C may be used to carry out one or more processes and/or produce data that can be used to automatically switch the vehicle 100 between the three operational modes.

Figure 3:
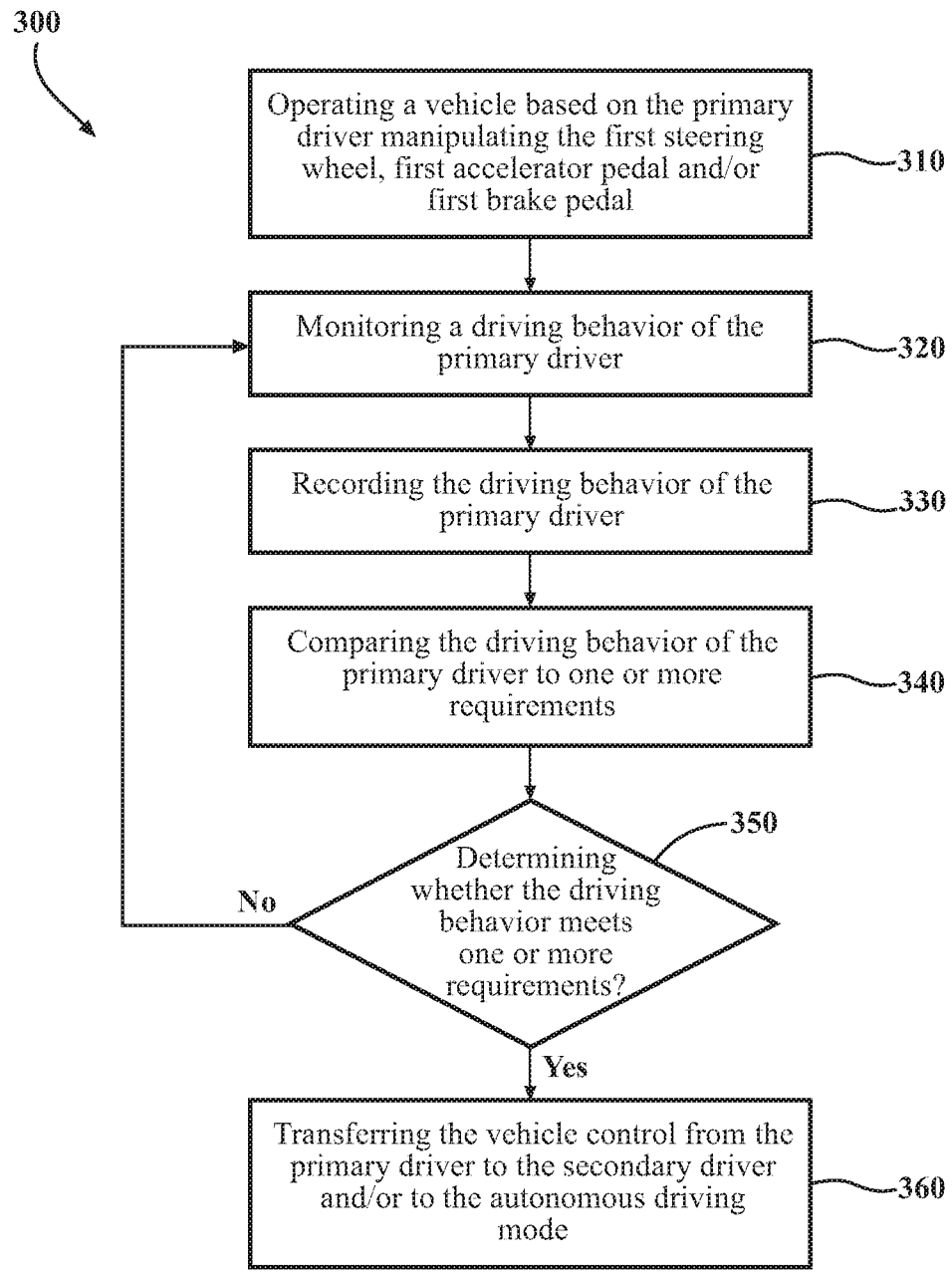
FIG. 3 depicts a flowchart of an illustrative method for transferring vehicle control between the operating modes based on a driving behavior of the vehicle of FIG. 1 according to one or more embodiments shown and described herein.

FIG. 3 depicts an illustrative method 300 for transferring vehicle control between the primary driver and the secondary driver. In block 310, the vehicle is operated based on the primary driver manipulating the first steering wheel, the first accelerator pedal and/or the first brake pedal. It should be appreciated that at block 310, the vehicle may be operated based on the secondary driver manipulating the second steering wheel, the second accelerator pedal and/or the second brake pedal. It should be understood that the vehicle operates and reacts to either the manipulation of the primary driver and/or the secondary driver. At block 320, the autonomous vehicle control module 200 monitors the driving behavior the primary driver. It should be understood that if the secondary driver is in the vehicle control, then the autonomous vehicle control module monitors the driving behavior of the secondary driver. At block 330, the autonomous vehicle control module records the driving behavior and compares the driving behavior to one or more requirements at block 340.

It should be understood that the one or more requirements may be predetermined rules, may be machined learned of good driving behaviors with respect to bad driving behaviors, and the like. At block 340, the autonomous vehicle control module determines whether the driving behavior meets the one or more requirements. If the driving behavior does not meet the one or more requirements, then the autonomous vehicle control module continues to monitor the driving behavior at block 320, record the driving behavior at block 340, and comparing the driving behavior at block 340 to determine whether the driving behavior meets the one or more requirements at block 350. The one or more requirements may be specific bad driving behaviors such as speeding, following too closely to other vehicles, disregarding traffic signals and the like. The driving behavior may be determined from the plurality of sensors, autonomous vehicle sensors, GPS and navigation systems, and the like.

If the driving behavior meets the one or more requirements at block 350, the autonomous vehicle control module transfers the vehicle control from the primary driver to the secondary driver and/or into the autonomous driving mode at block 360. It should be understood that if the secondary driver initially has the vehicle control at block 310, the autonomous vehicle control module transfers vehicle control from the secondary driver to the primary driver and/or to the autonomous driving mode at block 360.

Figure 4:
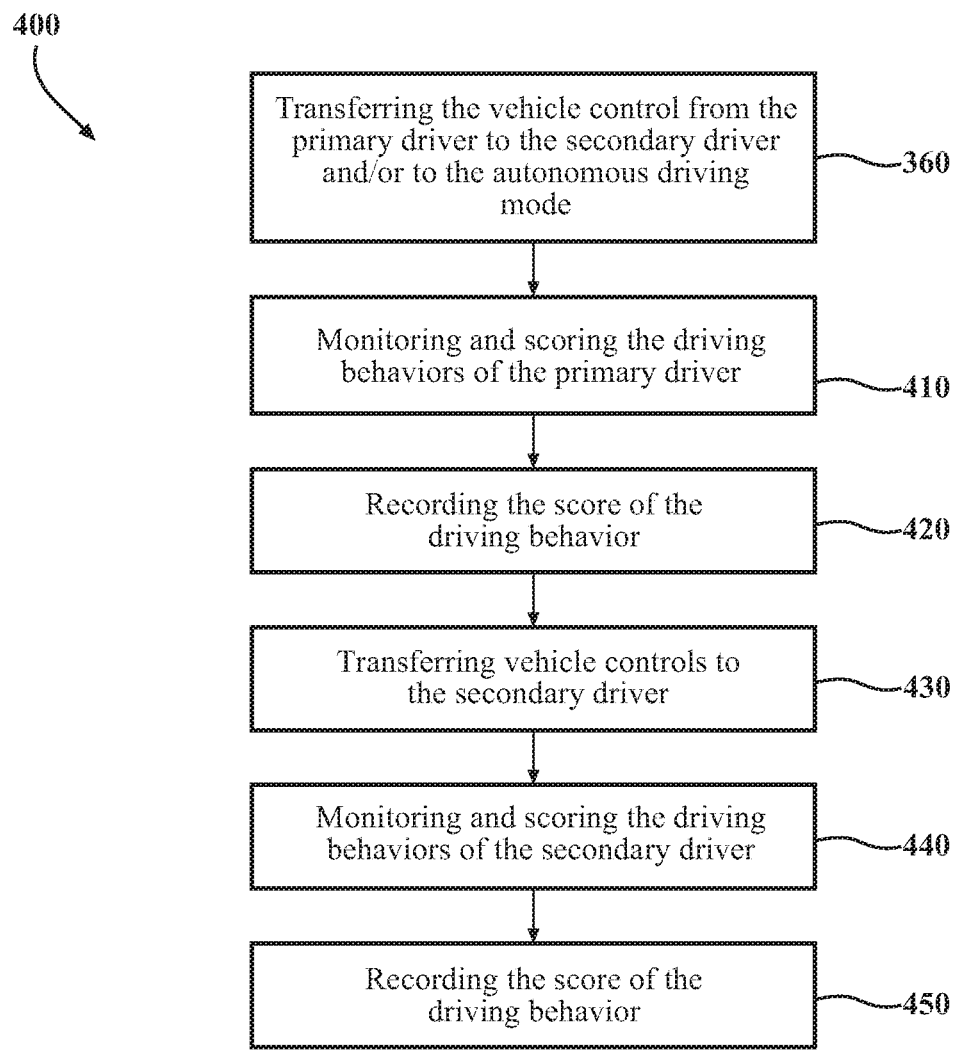
FIG. 4 depicts a flowchart of an illustrative method for scoring the driving behavior between a primary driver and a secondary driver of the vehicle of FIG. 1 according to one or more embodiments shown and described herein.

FIG. 4 depicts an illustrative method 400 for scoring the driving behavior between the primary driver and the secondary driver. At block 360, the autonomous vehicle control module transfers the vehicle control from the primary driver to the secondary driver and/or into the autonomous driving mode. It should be understood that if the secondary driver initially has the vehicle control at block 310 (FIG. 3), the autonomous vehicle control module transfers vehicle control from the secondary driver to the primary driver and/or to the autonomous driving mode at block 360. It should also be understood that the primary driver and/or the secondary driver may be source code (e.g., non-human). At block 410, the driving behaviors of the primary driver are monitored and scored. The driving behaviors are then recorded at block 420. At block 430, the vehicle control is transferred to the secondary driver and, at block 440, the driving behaviors of the secondary driver are monitored and scored. In embodiments, the driving behaviors are then recorded at block 450. It should be appreciated that both the human primary driver and human secondary driver may each be scored based on driving behaviors and/or the switching or transferring of the vehicle control between the human primary driver and human secondary driver may also be scored.

Further, in some embodiments, it should be appreciated that either or both of the primary driver and the secondary driver may be source code and that each may be scored based on driving behaviors and/or the switching or transferring of the vehicle control between the non-human primary driver and the non-human secondary driver may also be scored. The autonomous vehicle control module may then use machine learning to learn the good and bad driving behaviors based on the driving behaviors of the primary and second drivers. For example, the primary driver may be a certified trainer and the secondary driver may be a trainee. The autonomous vehicle control module may machine learn the driving behavior of the primary driver and score the secondary driver, or other primary drivers, to ensure that the trainee obtains a minimum score to be certified.

Figure 5:
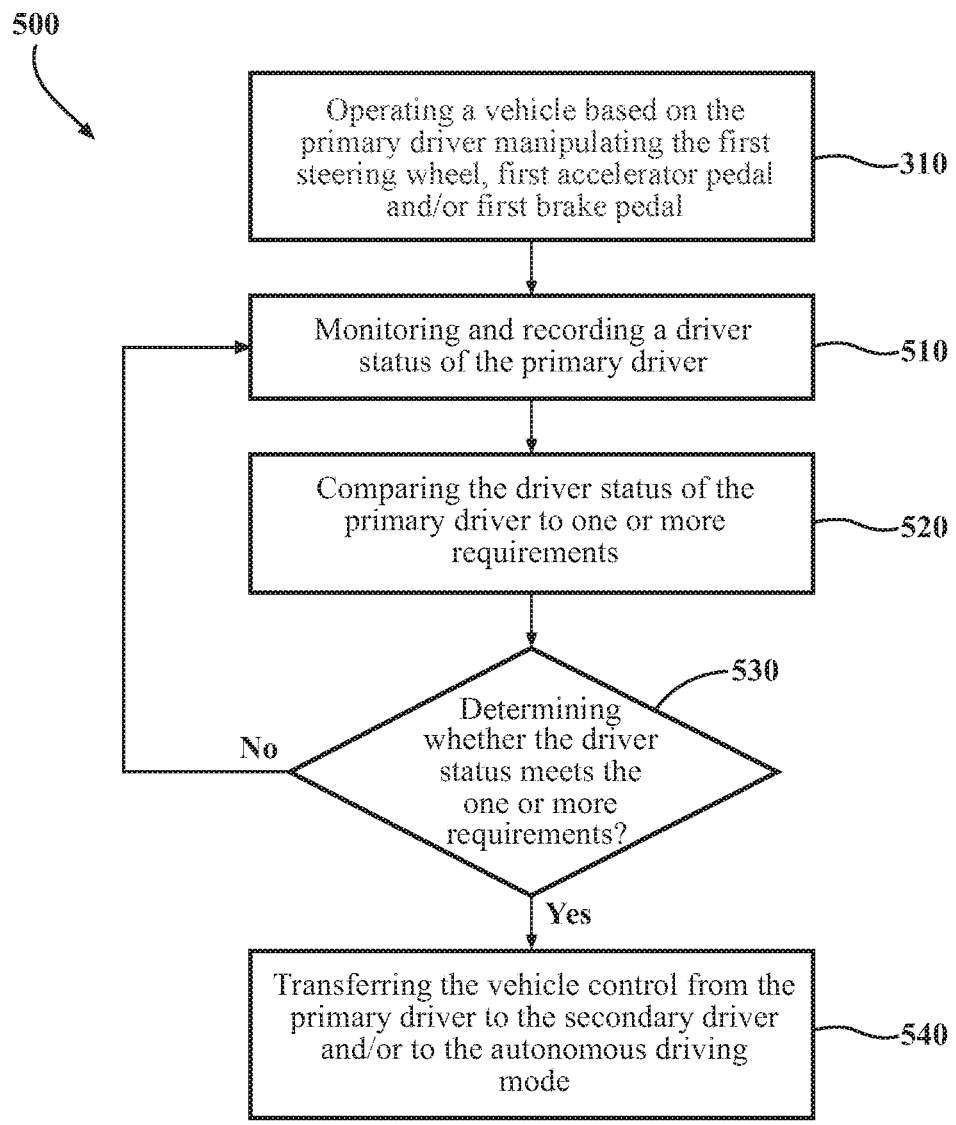
FIG. 5 depicts a flowchart of an illustrative method for transferring vehicle control between the operating modes based on a driver status according to one or more embodiments shown and described herein.

FIG. 5 depicts an illustrative method 500 for transferring vehicle control between the primary driver and the secondary driver based on a driver status. In block 310, the vehicle is operated based on the primary driver manipulating the first steering wheel, the first accelerator pedal and/or the first brake pedal. It should be appreciated that at block 310, the vehicle may be operated based on the secondary driver manipulating the second steering wheel, the second accelerator pedal and/or the second brake pedal. It should be understood that the vehicle operates and reacts to either the manipulation of the primary driver and/or the secondary driver. At block 510, the autonomous vehicle control module records the driver status of the primary driver. It should be understood that if the secondary driver is in the vehicle control, then the autonomous vehicle control module records the driver status of the secondary driver. It should be understood that the driver status may be determined by the sensed data of the plurality of sensors. For example, the driver status that may be sensed is a tired driver, an intoxicated driver, and the like. At block 520, the autonomous vehicle control module compares the driver status to one or more requirements.

It should be understood that the one or more requirements may be predetermined rules, may be machined learned of good driver status versus bad driver status, and the like. In some embodiments, the primary driver and/or secondary driver is instructed to drive similar to a teenager and/or similar to an intoxicated driver to learn the driving status of those drivers. At block 530, the autonomous vehicle control module determines whether the driving status meets the one or more requirements. If the driver status does not meet the one or more requirements, then the autonomous vehicle control module continues to monitor and record the driver status at block 510 and compare the driver status to the one or more requirements at block 520 to determine whether the driver status meets the one or more requirements at block 530. The one or more requirements may be specific bad driver status such as the tired driver, the intoxicated driver, and the like.

If the driver status meets the one or more requirements at block 530, the autonomous vehicle control module transfers the vehicle control from the primary driver to the secondary driver and/or into the autonomous driving mode at block 540. It should be understood that if the secondary driver initially has the vehicle control at block 310, the autonomous vehicle control module transfers vehicle control from the secondary driver to the primary driver and/or to the autonomous driving mode at block 540.

Figure 6:
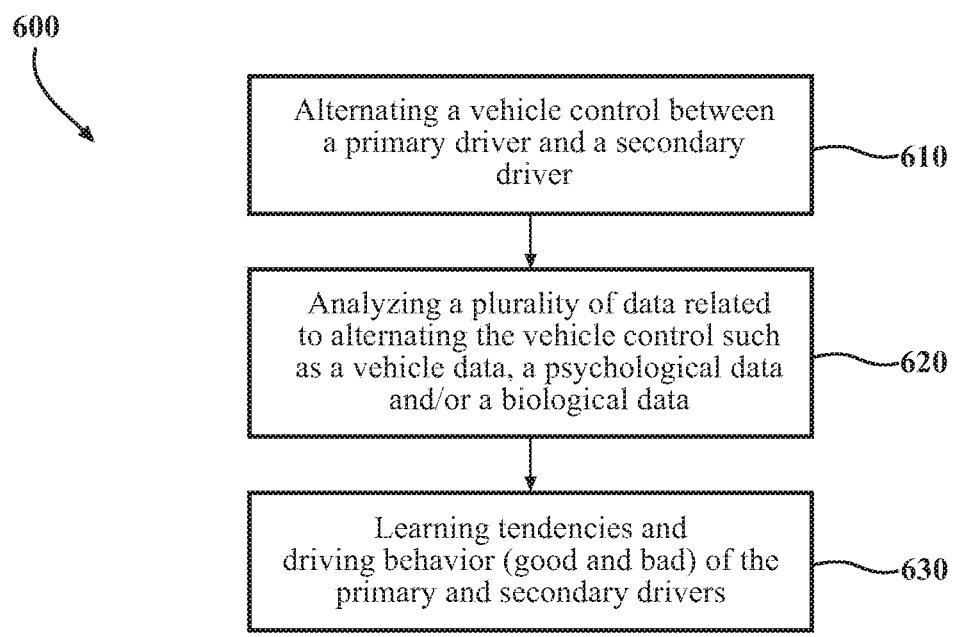
FIG. 6 depicts a flowchart of an illustrative method for obtaining and learning data on how drivers react to the transferring of vehicle controls between operation modes of the vehicle of FIG. 1, according to one or more embodiments shown and described herein.

FIG. 6 depicts an illustrative method 600 for leaning data on how drivers react to the transferring of vehicle control between the primary driver, the secondary driver, and the autonomous driving mode. At block 610, the vehicle control is alternated between the primary driver and the secondary driver. The alternating of vehicle control may be random or at predetermined set intervals. At block 620, a plurality of data is analyzed relating to the alternating transferring of vehicle control between the primary and secondary drivers. The plurality of data that is analyzed may be the vehicle data, a psychological and physiological data and a biological data of the primary and secondary drivers, and the like. The plurality of data may be used to determine how certain drivers react to the transferring of control, whether the vehicle control is to that driver and/or the vehicle control is away from that driver. In some embodiments, the primary and/or secondary drivers may also be instructed to impersonate different types of drivers, such as an intoxicated driver or a teenage driver. Data for the switching control may be generated for these different driver types. At block 630, the autonomous vehicle control module may machine learn the tendencies and driving behaviors of the primary and second drivers with respect to the transferring of vehicle control to promote a better or more efficient transference of the vehicle control for different types of driver types.

Figure 7:
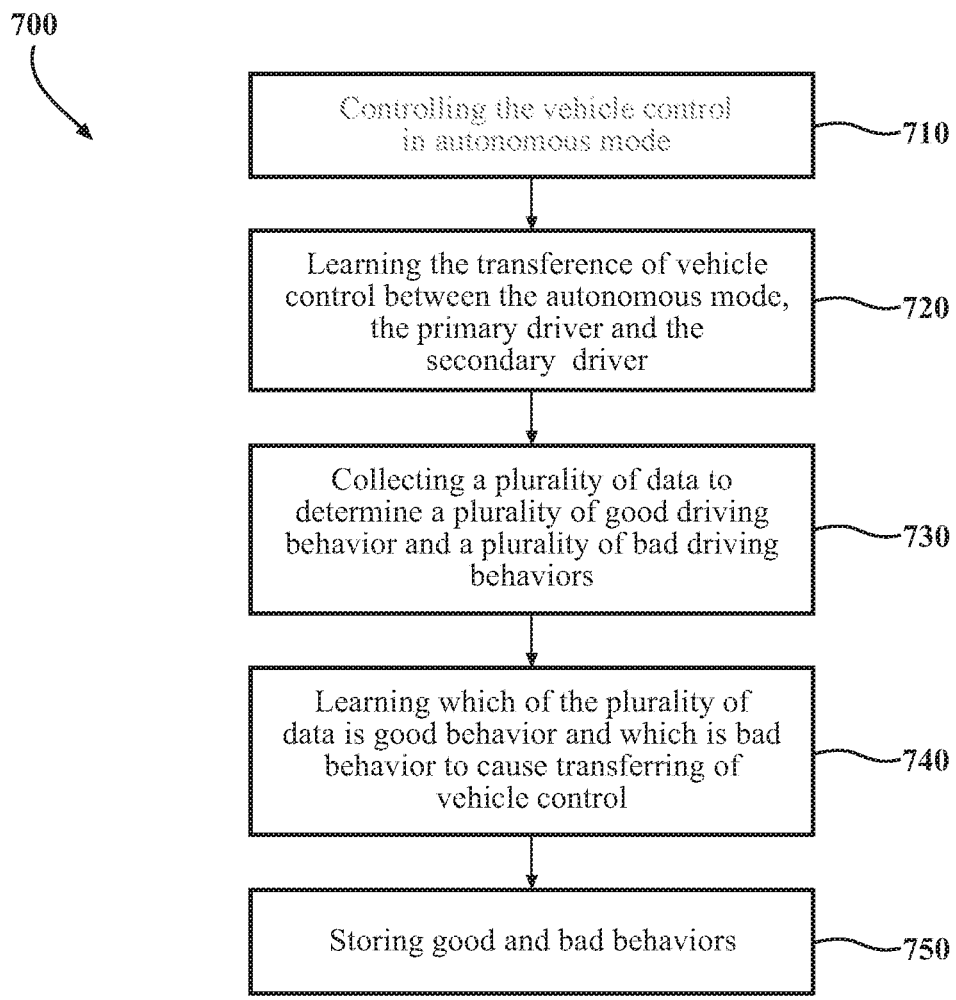
FIG. 7 depicts a flowchart of an illustrative method for machine leaning data such as good and bad driving behaviors according to one or more embodiments shown and described herein.

FIG. 7 depicts an illustrative method 700 for machine leaning data such as good and bad driving behaviors. At block 710, the vehicle control is in the autonomous mode such that the autonomous vehicle control module control has vehicle control of the vehicle. At block 720, the autonomous vehicle control module transfers the vehicle control to either the primary driver and/or the secondary driver and then machine learns a plurality of data relating to the transferring, as discussed with respect to FIG. 6. At block 730, the autonomous vehicle control module collects a plurality of data to determine a plurality of good driving behaviors, such as following posted speed limits, maintaining lanes, and the like and a plurality of bad driving behaviors. Such as exceeding or not maintaining a minimum speed, disregarding traffic signals, and the like. At block 740, the autonomous vehicle control module learns the plurality of good driving behaviors and the plurality of bad driving behaviors and stores these learned behaviors at block 750.

A vehicle system for operating a vehicle in different operating modes is provided. The vehicle system includes a first driving input device configured to receive a manipulation from a vehicle component by the primary driver, a second input device configured to receive a manipulation from a secondary driver and an autonomous vehicle control module configured to monitor a driving behavior of a first driver operating the first driving input. The autonomous vehicle control module also includes one or more processors, one or more memory modules communicatively coupled to the one or more processors, and machine readable instructions stored in the one or more memory modules that, when executed by the one or more processors, cause the vehicle system to monitor a driving behavior of the primary driver operating the first driving input and the secondary driver operating the second driving input, record the driving behavior of the primary driver operating the first driving input and the secondary driver operating the second driving input driving, determine whether the driving behavior of the primary driver operating the first driving input meets one or more requirements, and transfer vehicle control of the dual cockpit vehicle from the primary driver to the secondary driver when one or more requirements are met based on the driving behavior of the primary driver.

According to the present subject matter, because the autonomous controller obtains vehicle environment information while the vehicle is under the control of the primary driver, and immediately takes the control over from the primary driver in response to the occurrence of an autonomous take-over event, the vehicle system guides the primary driver to an optimal path. In addition, with the help of the virtual variable impedance disengagement, the vehicle may swiftly drive around an obstacle even when the primary driver holds the steering wheel tight without rotating the steering wheel. Furthermore, the vehicle system allows a secondary driver to take the control over in case the primary driver driving or the autonomous driving is not proper at the secondary driver's discretion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system comprising:
a first driving input device that controls a vehicle;
a second driving input device that controls the vehicle; and
a central processing unit configured to monitor via the first driving input device, a driving behavior of a first driver and to automatically transfer vehicle control of the vehicle from the first driver to a second driver when one or more requirements are met based on the driving behavior of the first driver,
wherein the central processing unit is further configured to analyze switching of vehicle control of the vehicle between the first driver and the second driver by machine learning the driving behavior of the first driver with respect to the switching of vehicle control to learn efficient transference of the vehicle control for different types of driver behaviors.

2. The vehicle system of claim 1, wherein the central processing unit is configured to instruct control of the vehicle from the second driver to the first driver when the one or more requirements are met based on a driving behavior of the second driver.

3. The vehicle system of claim 1, wherein the vehicle is a dual-cockpit vehicle.

4. The vehicle system of claim 3, further comprising:
at least two autonomous vehicle controller software algorithms, and each of the at least two autonomous vehicle controller software algorithms score the driving behavior of the first driver and a driving behavior of the second driver or score the transferring of the vehicle control of the vehicle from the first driver to the second driver.

5. The vehicle system of claim 3, further comprising:
one or more sensors configured to determine a driving status of the first driver and the second driver.

6. The vehicle system of claim 5, wherein the one or more requirements is the determined driver status of the first driver or the second driver.

7. The vehicle system of claim 6, wherein the determined driver status of the first driver or the second driver is a tired driver.

8. The vehicle system of claim 3, further comprising:
at least two autonomous vehicle controller software algorithms, and each of the at least two autonomous vehicle controller software algorithms instruct the first driver and the second driver to alternate between the vehicle control of the vehicle such that the central processing unit may analyze a plurality of data.

9. The vehicle system of claim 8, wherein the plurality of data includes a vehicle data, a psychological data, and a biological data to determine an efficiency of the switching of vehicle control between the first driver and the second driver.

10. The vehicle system of claim 9, wherein the first driver and the second driver are instructed to impersonate a driver from a group of an impaired driver, a tired driver, an intoxicated driver or a teenage driver to determine the switching of vehicle control between the first driver and the second driver.

11. The vehicle system of claim 3, wherein the central processing unit is further configured to:
autonomously control the vehicle without human intervention from the first driver or the second driver;
train the vehicle system to switch between the autonomous control of the vehicle, the first driver control of the vehicle and the second driver control of the vehicle;
collect a plurality of data to determine a plurality of good behaviors and a plurality of bad behaviors when the transfer of the vehicle control occurs between the autonomous control of the vehicle and between the first and second driver control of the vehicle; and
learn which of the plurality of data are good behaviors and which of the plurality of data are bad behaviors when the transfer of the vehicle control of the vehicle occurs.

12. A dual-cockpit vehicle comprising:
a first driving input device that controls the dual-cockpit vehicle;
a second driving input device that controls the dual-cockpit vehicle; and
a central processing unit further comprising:
one or more processors;
one or more memory modules communicatively coupled to the one or more processors; and
machine readable instructions stored in the one or more memory modules that cause the central processing unit to perform at least the following when executed by the one or more processors:
monitor via the first driving input device, a driving behavior of a first driver and monitor via the second driving input device, a driving behavior of a second driver,
record the driving behavior of the first driver operating the first driving input device and the second driver operating the second driving input device,
determine whether the driving behavior of the first driver operating the first driving input device meets one or more requirements,
transfer vehicle control of the dual-cockpit vehicle from the first driver to the second driver when the one or more requirements are met based on the driving behavior of the first driver, and analyze by machine learning the driving behaviors of the first driver and the second driver with respect to the transferring of vehicle control to learn efficient transference of the vehicle control for different types of driver behaviors.

13. The dual-cockpit vehicle of claim 12, wherein the machine readable instructions stored in the one or more memory modules cause the central processing unit to:
determine whether the driving behavior of the second driver operating the second driving input device meets the one or more requirements, and
transfer the vehicle control of the dual cockpit vehicle from the second driver to the first driver when one or more requirements are met based on the driving behavior of the second driver.

14. The dual-cockpit vehicle of claim 12, wherein the central processing unit is further configured to analyze switching of the vehicle control between the first driver and the second driver.

15. The dual-cockpit vehicle of claim 12, further comprising:
at least two autonomous vehicle controller software algorithms, and each of the at least two autonomous vehicle controller software algorithms score the driving behavior of the first driver and the driving behavior of the second driver or score the transferring of the vehicle control of the vehicle from the first driver to the second driver.

16. The dual-cockpit vehicle of claim 12, wherein the first driving input device is a first steering wheel and wherein the second driving input device is a second steering wheel.

17. The dual-cockpit vehicle of claim 12, wherein the first driving input device is a first accelerator pedal or a first brake pedal and wherein the second driving input device is a second accelerator pedal or a second brake pedal.

18. A vehicle system comprising:
a first steering wheel, a first accelerator pedal and a first brake pedal operated by a first driver to control a vehicle;
a second steering wheel, a second accelerator pedal and a second brake pedal operated by a second driver to control the vehicle; and
a central processing unit further comprising:
one or more processors;
one or more memory modules communicatively coupled to the one or more processors; and
machine readable instructions stored in the one or more memory modules that cause the central processing unit to perform at least the following when executed by the one or more processors:
monitor via the first steering wheel, the first accelerator pedal and the first brake pedal, a driving behavior of the first driver,
record the driving behavior of the first driver operating the first steering wheel, the first accelerator pedal and the first brake pedal,
determine whether the driving behavior of the first driver operating the first steering wheel, the first accelerator pedal and the first brake pedal meets one or more requirements,
transfer vehicle control of a vehicle from the first driver to the second driver when the one or more requirements are met based on the driving behavior of the first driver, and
analyze by machine learning the driving behavior of the first driver with respect to the transferring of vehicle control to learn efficient transference of the vehicle control for different types of driver behaviors.

19. The vehicle system of claim 18, wherein the machine readable instructions stored in the one or more memory modules cause the central processing unit to:
monitor via the second steering wheel, the second accelerator pedal and the second brake pedal, a driving behavior of the second driver,
record the driving behavior of the second driver operating the second steering wheel, the second accelerator pedal and the second brake pedal,
determine whether the driving behavior of the second driver operating the second steering wheel, the second accelerator pedal and the second brake pedal meets a second set of one or more requirements, and
transfer the vehicle control of the vehicle from the second driver to the first driver when the second set of one or more requirements are met based on the driving behavior of the second driver.

20. The vehicle system of claim 19, wherein the machine readable instructions stored in the one or more memory modules further include at least two autonomous vehicle controller software algorithms, and each of the at least two autonomous vehicle controller software algorithms score the driving behavior of the first driver and the driving behavior of the second driver or score the transferring of the vehicle control of the vehicle from the first driver to the second driver.

* * * * *